Patented June 11, 1929.

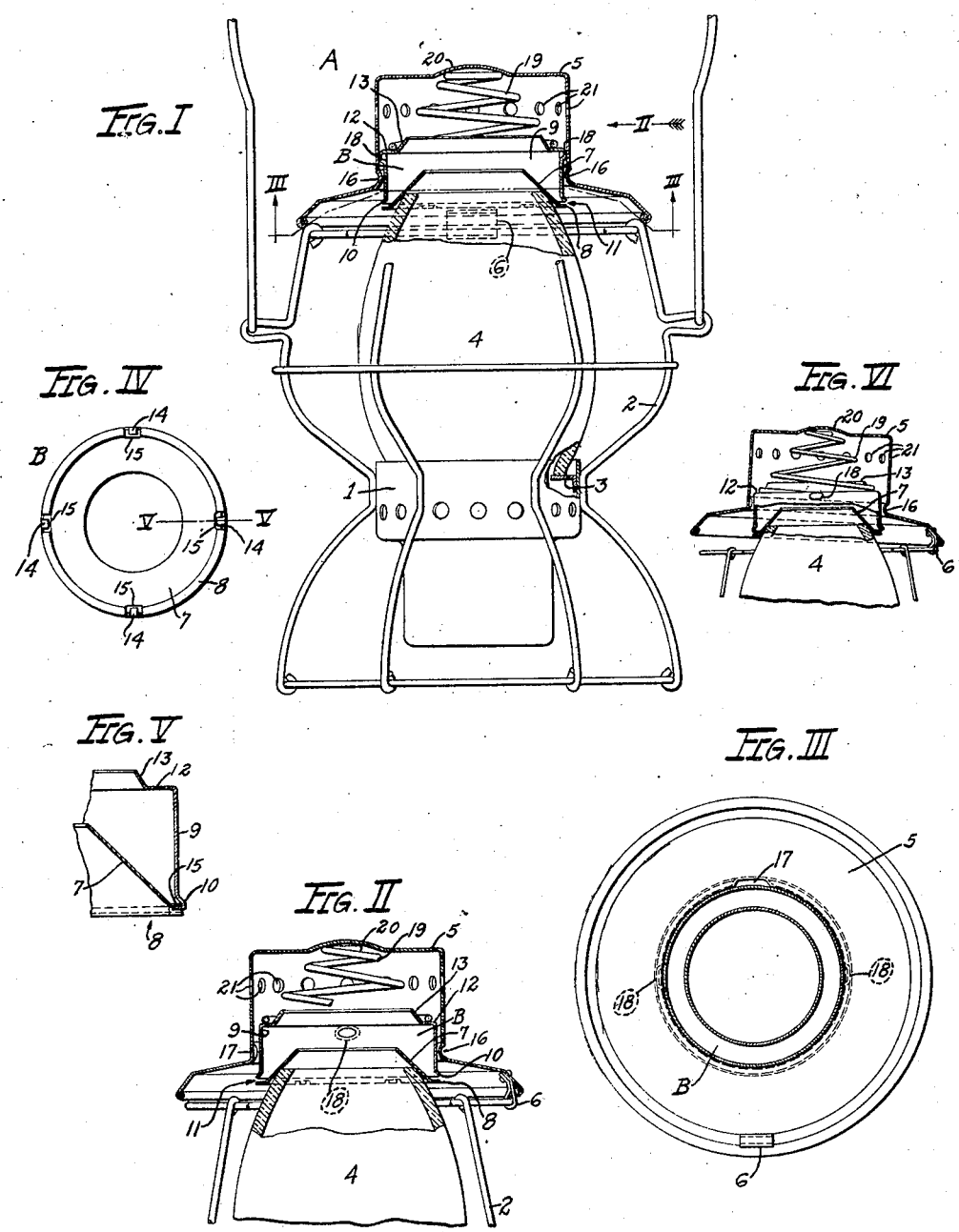

1,716,514

UNITED STATES PATENT OFFICE.

EDWARD G. BRINKMEYER AND GEORGE H. ROLFES, OF ST. LOUIS, MISSOURI, ASSIGNORS TO ALEXANDER H. HANDLAN, OF ST. LOUIS, MISSOURI.

LANTERN.

Application filed April 3, 1925. Serial No. 20,358.

This invention relates generally to hand lanterns of the type used by trainmen and has for its object the production of a hand lantern provided with improved means for positively holding the lantern globe so as to prevent the ingress of air currents between the bottom face of the globe and its seat.

Prior to this invention lanterns have been constructed with a seat for the base of the globe and an annular spring-pressed globe holder engaging the upper portion of the globe. The spring-pressed globe holder is adapted to slide within the dome longitudinally thereof and its function is to force the globe downwardly onto its seat and at the same time to position centrally the upper portion of the globe with respect to the dome. The dome of a lantern of the type disclosed herein is usually pivoted with respect to the guard frame of the lantern and the spring-pressed globe holder is supported by and moves with the pivoted dome when said pivoted dome is swung on its pivot. Generally, prior to this invention when the pivoted dome of a lantern was in an open position and was being moved to a closed position, the spring-pressed globe holder would contact with the upper edge of the globe at one side of said globe and as the pressure of said spring-pressed globe holder increased, due to the downward movement of the dome, the lantern globe would be tipped whereby a portion of the base of said globe would be drawn off of the globe seat. The downward pressure of the spring-pressed globe holder heretofore used was approximately uniform against the entire top face of the lantern globe and it frequently happened because of this fact that the tipped globe was not righted when the dome reached its closed position but said globe remained in its tipped position. The result of this was that during the giving of certain signals with the lantern a current of air was permitted to enter the lantern between the bottom face of the globe and the globe seat, thus causing the flame to be dimmed or quite probably completely extinguished.

The spring-pressed globe holder, as embodied in the present invention, is so arranged that it is capable of pivotal movement relative to the dome with which it is associated and because of this arrangement said globe holder may center itself with respect to the top edge of the lantern globe whereby the tendency of said lantern globe to be tipped when the lantern dome is being moved to a closed position is eliminated.

Another advantage of the lantern disclosed herein over the lanterns constructed as heretofore has to do with the manner in which the drafts which pass through the lantern dome during the giving of certain signals are controlled, the elements of the lantern being so constructed and arranged that the tendency for said drafts to extinguish the flame in the lantern is greatly reduced.

Fig. I is a view partly in elevation and partly in vertical section, showing a lantern provided with our improved globe holding means, a portion of the bail of said lantern being broken away.

Fig. II is a fragmentary view showing the upper portion of a lantern provided with our improved globe holding means, said view showing the lantern as it will appear when viewed as indicated by the feathered arrow in Fig. I.

Fig. III is a section on line III—III of Fig. I looking upwardly into the dome as indicated by the arrows in Fig. I.

Fig. IV is an inverted plan view of the globe holding means.

Fig. V is a section on line V—V of Fig. IV.

Fig. VI is a fragmentary view illustrating the upper portion of our improved lantern and showing one position to which the globe holding means will be moved when the dome of the lantern is being moved to closed position.

In the drawing A designates a hand lantern of the type used by trainmen which lantern is provided with an oil font holder 1 secured in any suitable manner, as for instance by welding, to a guard frame 2. 3 designates a globe seat which is secured to the oil font holder 1 and is adapted to receive the flat bottom face of the lantern globe 4. 5 designates the dome of the lantern which is pivotally connected to the guard frame 2 by means of a hinge 6 (Fig. II). Lanterns of the type disclosed in the present application are usually provided with latching devices whereby the dome 5 may be fastened in a closed position but as these devices are common and form no part of the present invention, we have not illustrated one in connection with the lantern shown in the drawing.

B desigates our improved globe holder and presser member which comprises a conical member 7 having an annular horizontal flange 8 at its lowermost edge and a cylindrical member 9 which is provided with an outwardly flared lower portion 10. By referring to Figs. I and II of the drawing it will be seen that the annular horizontal flange 8 of the member 7 is spaced apart in a vertical direction from the outwardly flared portion of the annular side wall of the cylindrical member 9 to provide spaces 11, the purpose of which will be subsequently pointed out. The cylindrical member 9 is provided with an annular top wall 12 having an upwardly inclined annular portion 13, said portions 12 and 13 of said top wall being preferably formed integral with the side wall of said member 9.

To secure the conical member 7 to the cylindrical member 9, we provide said cylindrical member with a plurality of tongues 14 which are preferably formed integral with the side wall of said cylindrical member at the lower edge thereof, said tongues normally being extended downwardly. The horizontal annular flange 8 on the conical member 7 is provided with depressed portions 15 of a number equal to the number of tongues 14 on the associated cylindrical member 9, said portions 15 being depressed such distances that when the members 7 and 9 are associated with each other so that the spaces 11 are provided these depressed portions on the flange of the member 7 will contact with the lower edge of the outwardly flared portion 10 of the member 9. To assemble the parts 7 and 9, the member 7 is arranged within the member 9, as shown in Figs. I and II, said member 7 being so positioned relative to the member 9 that the depressed portions 15 of said member 7 are adjacent to the tongues 14 on the member 9. The tongues 14 are then bent over, as shown in Fig. V, until they contact with the lower faces of the depressed portions 15 of the annular horizontal flange 8 whereby said members 7 and 9 are secured together. It is plain from the foregoing that the members 7 and 9 are securely fastened together by the tongues 14, and because of the presence of the depressed portions 15 the horizontal flange 8 and the outwardly flared portion 10 are maintained a fixed distance apart to provide the spaces 11 which are located between adjacent depressed portions 15.

Formed on the dome 5 of the lantern A is an inwardly extended bead 16. The bead 16 is circular in shape and its opposite ends terminate a slight distance short of each other to provide a passageway 17 through the bead (Figs. II and III). Except for the passageway 17, the bead 16 is continuous. Formed on the side wall of the member 9 adjacent to the top edge thereof is a pair of nubs 18, said nubs being arranged diametrically opposite to each other and being formed preferably by forcing some of the metal of the side wall of said member 9 outwardly.

19 designates a coil spring which is interposed between the top wall of the dome 5 and the top wall 12 of the cylindrical member 9. The coil spring 19 is conical in shape as shown in Figs. I and II, the wider portion thereof being adjacent to the member 9 and being arranged to surround the upwardly inclined portion 13 of the top wall 12 of said member 9 whereby said spring is prevented from being accidentally displaced relative to said member 9. The upper end of the coil spring 19 is seated in a depression 20 in the top wall of the dome 5. It is plain from the foregoing that the coil spring 19 tends to force the globe holder B downwardly within the dome 5. 21 designates the usual apertures arranged in the side wall of the dome 5 of the lantern A.

To locate the globe holder within the dome 5, said globe holder is brought to a position where one of the nubs 18 is in alinement with the passageway 17 through the bead 16. The globe holder B is then tilted and the portion of said globe holder on which the opposite nub is located is introduced into the upper portion of the dome in such position that the nub thereon will be located above the bead 16. The remaining portion of the globe holder is then passed into the upper portion of the dome, the first mentioned nub 18 passing through the passageway 17. After both of the nubs have been located within the upper portion of the dome and above the bead 16 as described, the globe holder is rotated approximately one quarter of a revolution, thus moving the first mentioned nub out of alinement of the passageway 17. It is apparent that the globe holder B may not be ejected from the dome 5 of the lantern by the coil spring 19 after said globe holder has been located therein as just described, due to the fact that the nubs 18 overlap the bead 16 as shown clearly in Fig I and because both of said nubs are offset from the passageway 17.

By referring to Fig. I of the drawing, it will be seen that the nubs 18 contact with the inside face of the side wall of the dome 5 and that there is a slight annular space between the face of the bead 16 and the outer face of the side wall of the cylindrical member 9. Due to the fact that the nubs 18 contact with the wall of the dome as described, said nubs function as pivots on which the globe holder B may swing, the axes of said pivots being approximately parallel with the axis of the pivot on which the dome 5 swings. By referring now to Fig. VI, it will be seen that when the horizontal dome is being moved from an open to a closed position one side of the globe holder B contacts with one side of the lantern globe at the top edge thereof as heretofore, but the globe holder B of the lantern disclosed herein is capable of pivotal movement relative to the dome as already described. The result of this is that instead of the lantern globe being tilted by the globe holder as was the case with the relatively rigid globe holders, formerly used, the globe holder of our improved lantern will swing on its pivots to a position where it will center itself on the top face of the lantern globe as shown in Fig. VI and consequently during the last portion of the movement of the dome 5 the pressure exerted by the coil spring 19 against the lantern globe will be parallel with the axis of said lantern globe whereby the lantern globe will be forced firmly and evenly onto the globe seat 3. By providing the globe holder B with a conical member 7, the globe holder is positively seated on the top of the lantern globe and the upper portion of said lantern globe is positively moved to a central position each time said conical member is brought into contact with said upper portion of said lantern globe.

In the use of hand lanterns of the type disclosed herein it quite frequently happened prior to this invention that the flame within the lantern was extinguished by cross currents of air which passed transversely through the dome during the giving of certain signals, said cross currents having the effect of causing swift movements of air within the lantern globe. In the use of our improved lantern in giving the signals mentioned, air will pass through the openings 11 between the horizontal flange 8 of the member 7 and the outwardly flared portion 10 of the member 9 and said air will be deflected upwardly by the inclined wall of said conical member, away from the upper end of the globe thus providing a current of air which will prevent air which enters through the apertures 21 from passing downwardly into the lantern globe and extinguishing the flame therein.

We claim:

1. A lantern having a dome, a globe, a seat for the bottom face of said globe, a spring pressed globe holder, an inwardly extended bead on said dome, said bead having a passageway formed therethrough, and a pair of oppositely disposed protuberances formed on said globe holder, one of said protuberances being capable of being passed through said passageway whereby said protuberances may be located within the dome and above said bead, and said protuberances being adapted to contact with a wall of said dome whereby pivotal movement may be imparted to said globe holder.

2. A lantern having a dome, a globe, a seat for the bottom face of said globe, a spring pressed globe holder, an inwardly extended member on said dome, a pair of oppositely disposed protuberances on said globe holder, said protuberances being arranged within said dome and above said inwardly extended member to connect said globe holder and said dome together, said protuberances being adapted to contact with a wall of said dome whereby pivotal movement may be imparted to said globe holder, said globe holder comprising an outer cylindrical member and an inner member having a conical wall, the walls of said outer and inner members being spaced apart from each other to provide spaces through which air may pass and said conical wall of said inner member being adapted to deflect said air.

3. A lantern having a dome, a globe, a seat for the bottom face of the globe, and a spring pressed globe holder pivotally mounted within the dome, said holder comprising a cylindrical shaped member having a hollow frusto conical shell removably supported thereby.

4. A lantern having a dome, a globe, a seat for the bottom face of the globe, and a spring pressed globe holder pivotally mounted within the dome, said holder comprising a cylindrical shaped member having a hollow frusto conical shell removably secured thereto by means of interengaging tongues and flanges formed one on the cylindrical member and the other on the frusto conical shell.

In testimony that we claim the foregoing we hereunto affix our signatures.

EDWARD G. BRINKMEYER.
GEORGE H. ROLFES.